Aug. 6, 1929.  T. MIDGLEY  1,723,572
EXPANDING DEVICE FOR TIRE CASINGS
Filed Aug. 12, 1925
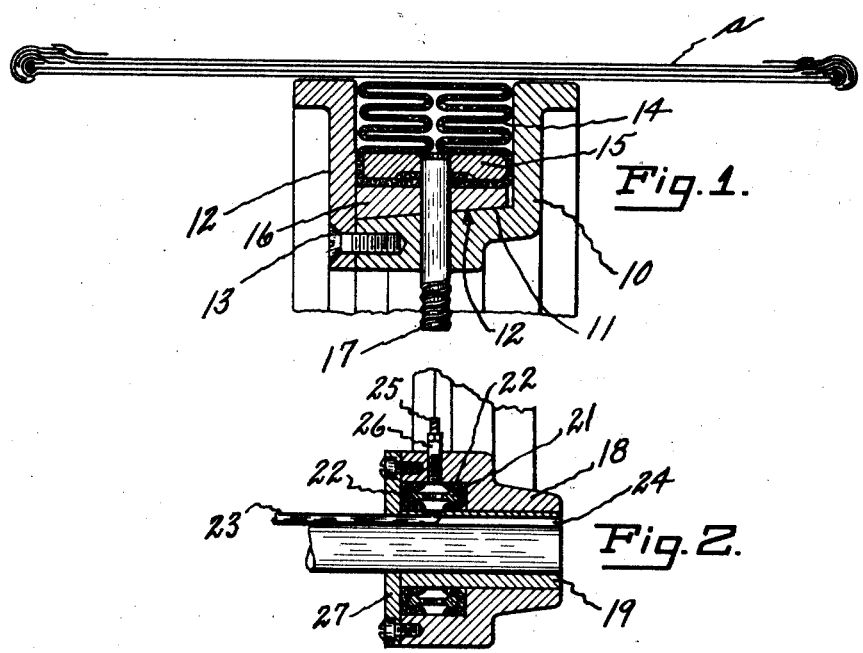
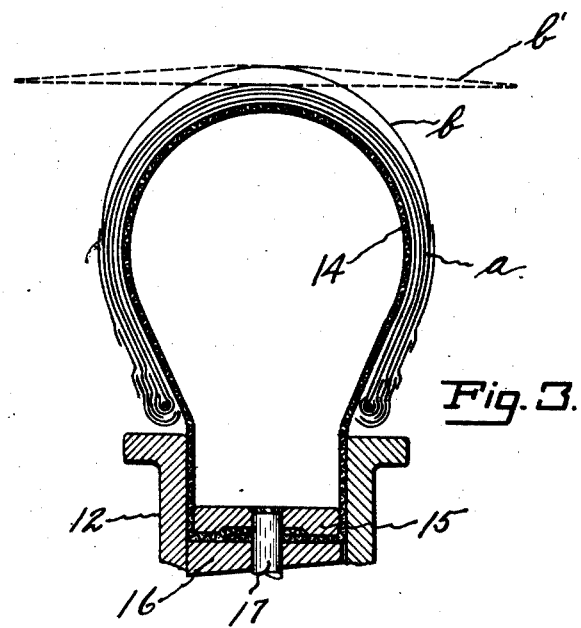
INVENTOR.
Thomas Midgley
BY
Edward C. Taylor
ATTORNEY.

Patented Aug. 6, 1929.

1,723,572

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

EXPANDING DEVICE FOR TIRE CASINGS.

Application filed August 12, 1925. Serial No. 49,695.

My present invention relates to a device for expanding tire casings from the flat, and for other uses which will suggest themselves to the skilled rubber workman. One object of this invention is to provide a bag which will give the stretch desired in the tire without undue stretching of the bag and consequent distortion of the bag and tire. Another object is to provide a bag which will, when deflated, occupy a very small space and yet will be capable of expanding a tire of large size. Other and further objects will appear from the following description.

Referring to the drawings:

Fig. 1 is a section through one side of a bag made according to the present invention, showing a flat tire carcass in place ready for expansion;

Fig. 2 is a detail section showing the manner in which the air connection may be made in case it is desired to mount the bag on a rotating support; and Fig. 3 is a section similar to Fig. 1 but showing the bag and tire in expanded position.

In Fig. 1, 10 represents a channeled wheel or rim which may be supported in any way desired on a shaft. If it is desired to do any work on the tire after it has been expanded, it may be preferable to make the mounting of this wheel rotatable, otherwise it may be fixed. The bottom of the channel is made slanting as at 11 for a purpose to be described. A ring 12, shaped to complete the channel, is attached to the rim 10 by screws 13. In the channel formed by this means is located the bag 14, formed of rubberized fabric of either the cord or square woven type, suitably vulcanized.

As a convenient way of forming a fluid tight joint in the bag and at the same time permitting the bag to be built up of vulcanized material in sheet form, I have shown the inner ends of the bag material as overlapped under an endless ring 15. Underlying the ring 15, and serving to press the ends of the material against it, is a second ring 16 which is transversely split at one point. The inner periphery of this ring is made on a taper to correspond with the taper of the surface 11 previously referred to. The ring 16 forms in effect a tapered wedge which, when driven up on the tapered surface of the rim 10, will bind the edges of the bag forming material firmly against the bottom of the ring 15, and making thereby a fluid tight joint. A valve stem 17 extends through the rim 10 and the rings 15 and 16, accomplishing a double purpose of admitting air to the bag and holding the rings firmly in place on the rim. This latter function is also accomplished by the ring 12.

In case the bag is to be mounted on a rotating support, the air supply may be arranged conveniently as shown in Fig 2. The hub 18, which supports the bag holding device, is rotatably mounted on a sleeve 19 which surrounds the shaft 20. The hub is cut away at 21 to receive doubled packings 22. A pipe 23 leads into the sleeve 19 through a slot 24 and opens into the space between the packings 22. The valve stem 17 is connected by a flexible tube 25 with a nipple 26 which leads also into the cavity between the packings. A plate 27 covers the cavity and holds the packings in place. By this connection air may be admitted to the cavity from the pipe 23, and is discharged into the nipple 26 and the flexible tube 25 to the bag.

Little need be said in addition as to the method of operating the device. In Fig. 1 a tire carcass in flat form is shown at $a$. Upon the admission of air into the bag the latter will unfold and stretch the tire outwardly into the usual tire shape, as shown in Fig. 3. In the case shown the tread of the tire is not put on until the tire has been expanded, and is shown before application at $b'$ and after application at $b$. After the tread has been applied the bag can be deflated, with the assistance of a vacuum if desired, the permanent folds in which it is formed causing it to reassume the position in which it is shown in Fig. 1. The bag is by this mode of construction rendered very small in size when deflated, and yet is capable of a considerable expansion. When deflated it is held out of the way and protected in the channel of the rim, facilitating the positioning of the flat carcass. It is likewise readily retracted into the channel after inflation to permit the ready removal of the formed carcass or completed tire.

Having thus described my invention, I claim:

A device for use in expanding tire casings comprising a holder having an annular channel in its outer periphery, and an inflatable annular bag located in said channel and having its walls constructed of vulcanized rubberized fabric and preformed with fold lines determining a plurality of reverse folds, whereby the bag will expand on inflation and will on deflation contract into the channel by folding on itself along the preformed fold lines.

THOMAS MIDGLEY.